May 20, 1924.  1,494,881
H. C. BAINES
SELF PROPELLED AGRICULTURAL IMPLEMENT
Filed Sept. 20, 1922    2 Sheets-Sheet 2
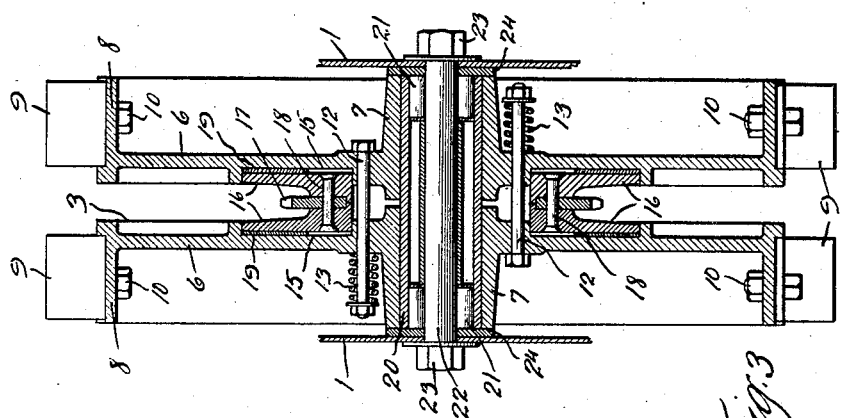
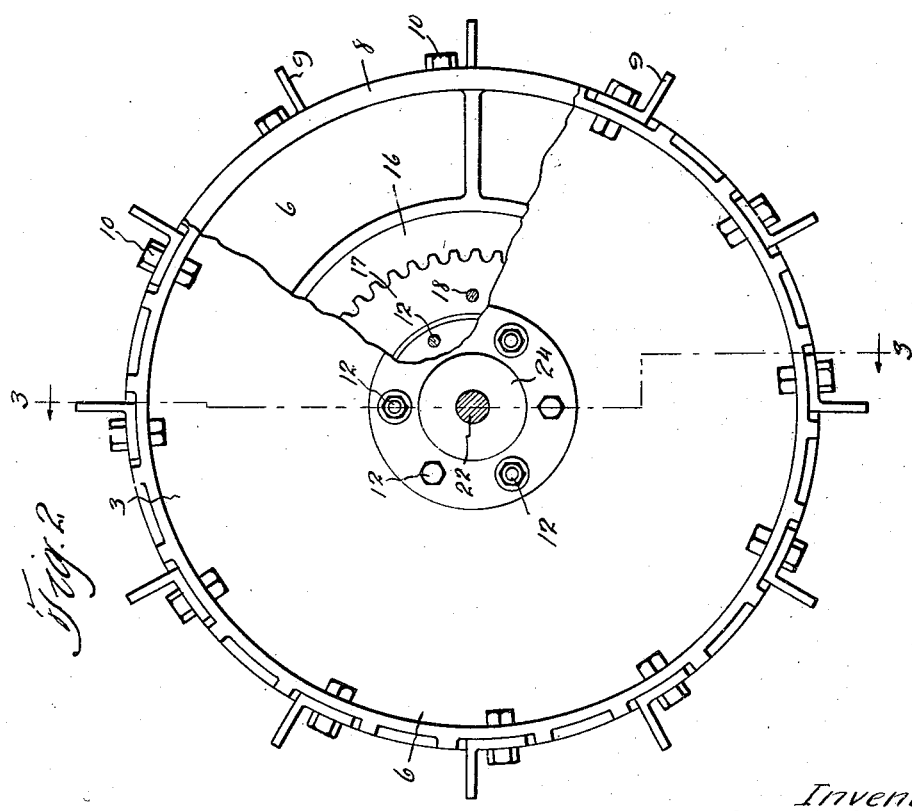
Inventor
Henry C. Baines Patented May 20, 1924.

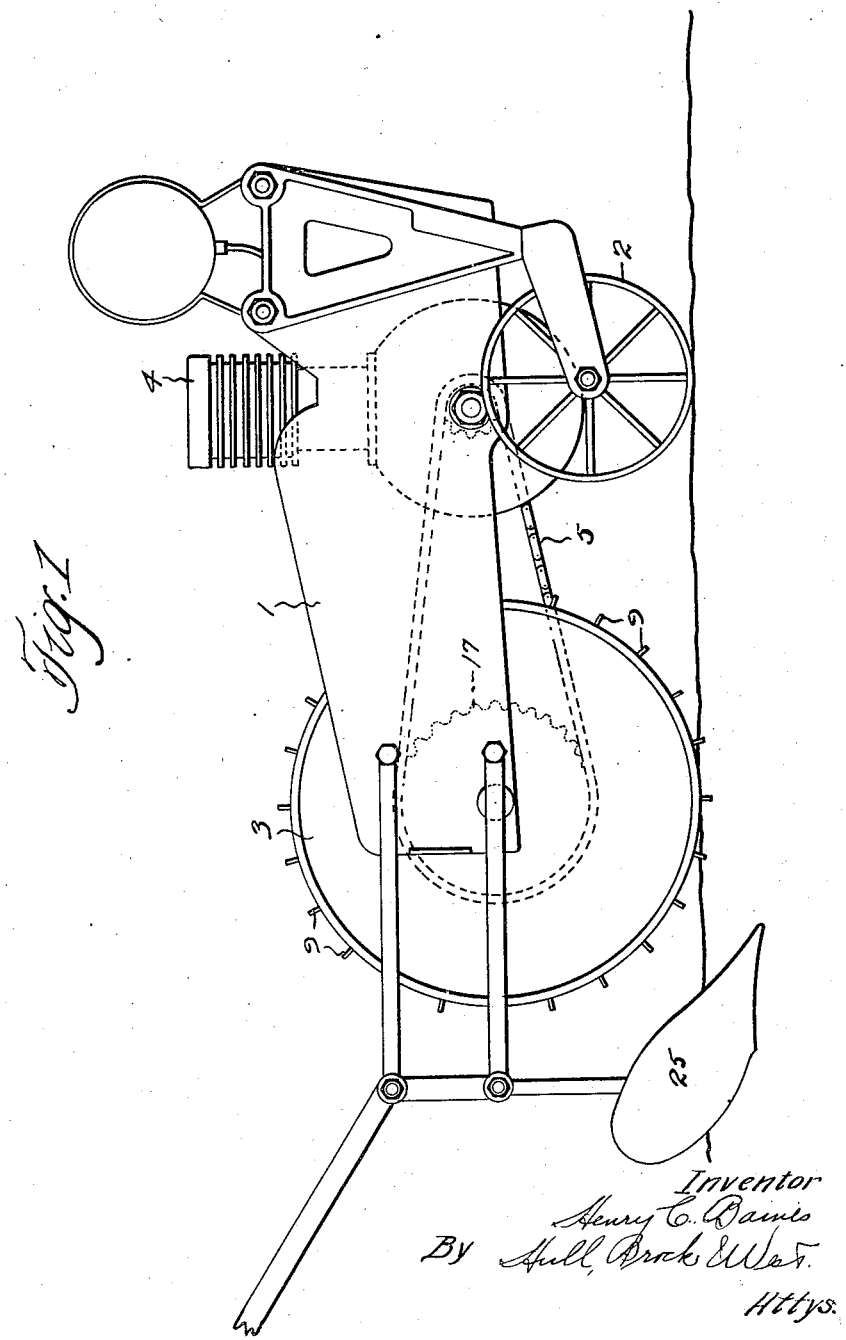

1,494,881

UNITED STATES PATENT OFFICE.

HENRY C. BAINES, OF DOVER, OHIO, ASSIGNOR TO THE BAINES ENGINEERING COMPANY, OF CANAL DOVER, OHIO, A CORPORATION OF OHIO.

SELF-PROPELLED AGRICULTURAL IMPLEMENT.

Application filed September 20, 1922. Serial No. 589,311.

*To all whom it may concern:*

Be it known that I, HENRY C. BAINES, a subject of the King of England, residing at Dover, in the county of Tuscarawas and State of Ohio, have invented a certain new and useful Improvement in Self-Propelled Agricultural Implements, of which the following is a full, clear, and exact description, reference being had to the accompanying drawings.

This invention relates to self-propelled agricultural implements and has particular reference to certain improvements over the implement shown in my Patent No. 1,399,040 of December 6, 1921.

The primary object of the present invention is to provide an improved form of traction wheel which is composed of two traction elements yieldingly clamped together and having a driving element frictionally clamped therebetween.

Another object is to provide a traction wheel which shall be composed of few parts which are simple in construction and easy to assemble.

A still further object is to provide a traction wheel which shall absorb the impact of engagement of the clutch which connects the source of power with the driving element of the traction wheel.

With these and other objects in view the invention consists of the various novel features of construction and arrangement or combination all of which will be fully described hereinafter and pointed out in the appended claims.

In the accompanying drawings wherein I have shown one form of my invention, Fig. 1 is a side elevation of an agricultural implement employing a traction wheel constructed in accordance with my invention; Fig. 2 is a side elevation with parts broken away of the traction wheel; and Fig. 3 is a vertical sectional view taken on the line 3—3 of Fig. 2.

Describing by reference characters the various parts illustrated, 1 denotes the side frames of the vehicle which are supported adjacent one end by wheels 2 and adjacent the opposite end by a traction wheel 3. An internal combustion engine 4 is supported with the frame and is operatively connected with the traction wheel 3 by means of a link belt 5.

The traction wheel 3 is composed of two disks 6 each having a central hub portion 7 and an outer circumferential flange 8. A series of ground engaging implements 9 are secured to each flange 8 in any suitable manner as by means of bolts 10. The disks 6 are yieldingly clamped together adjacent their hubs 7 by means of a plurality of bolts 12 extending therethrough and having a spring 13 interposed between each nut and the disk 6. In the present instance six bolts are used, three of which are arranged with their heads abutting one disk and the other three are arranged with their heads abutting the opposite disk. These bolts are preferably arranged alternately as shown in Fig. 2.

The abutting faces of disks 6 are recessed as indicated at 15 to receive the driving gear assembly. This driving gear assembly is composed of two annular plates 16 having a driving sprocket 17 interposed therebetween and the whole secured together as by means of rivets 18. The outer face of each of plates 16 is fitted with friction material 19 such as any of the well known automobile brake lining materials available on the market. The driving gear assembly is yieldingly clamped between the disks 6 by springs 13 and drives the disks by frictional contact therewith.

A bearing sleeve 20 extends through the hub portions 7 of the disks and receives a roller bearing 21 at each end thereof. An axle 22 extends through bearings 21 and is fitted at each end with a nut 23 whereby the traction wheel may be clamped in the side frames 1. I preferably interpose a washer 24 between each roller bearing 21 and the side frame 1 so as to prevent lubricant from escaping from the bearings and also to protect the bearings from dust and dirt.

In operation the engine 4 is connected with the traction wheel through link belt 5 and a clutch, not shown. The impact of the engagement of the clutch is absorbed by momentary slippage of the driving gear assembly with respect to the disks 6, after which the traction wheel is rotated by frictional contact of the driving gear assembly with said disks. Rotation of the traction wheel serves to propel the vehicle and draw an agricultural implement 25 which may be connected in any suitable manner with the vehicle.

Having thus described my invention, what I claim is:

1. In a self-propelled vehicle of the class described, the combination with a frame, of a tractor wheel journaled in said frame, said wheel being composed of two traction members yieldingly clamped together, the opposed faces of said members being each provided with an annular recess, a power transmitting element interposed between said traction members and disposed within said recess, friction material interposed between said element and said traction members, an internal combustion engine mounted on said frame, and driving connections between said engine and said power transmitting element.

2. In a self-propelled vehicle of the class described, the combination with a frame, of a tractor wheel journaled in said frame, said wheel being composed of two traction members yieldingly clamped together, the opposed faces of said members being each provided with an annular recess, a power transmitting element interposed between said traction members and disposed within said recess, friction material interposed between said element and said traction members, a bearing sleeve projecting through the hub portions of said traction members, a bearing in each end of said sleeve, an axle projecting through said bearings and connected to said frame, an internal combustion engine mounted on said frame, and driving connections between said engine and said power transmitting element.

3. In a self-propelled vehicle of the class described, the combination with a frame, of a traction wheel journaled in said frame, said wheel being composed of two traction members yieldingly clamped together, the opposed faces of said members being each provided with an annular recess, a power transmitting assembly disposed within said recess, said assembly comprising two annular plates having a sprocket gear interposed therebetween, means for securing said plates and gear together, friction material interposed between said plates and said traction members, an internal combustion engine mounted on said frame, and driving connections between said engine and said sprocket gear.

In testimony whereof, I hereunto affix my signature.

HENRY C. BAINES.